(12) United States Patent
Wang

(10) Patent No.: US 6,905,062 B2
(45) Date of Patent: Jun. 14, 2005

(54) AUTOMATED SOLDERING SYSTEM WITH MULTIPLE FEED LINES

(75) Inventor: Johnny Wang, Taoyuan (TW)

(73) Assignee: Hannstar Display Corp., Taipei (TW)

( * ) Notice: Subject to any disclaimer, the term of this patent is extended or adjusted under 35 U.S.C. 154(b) by 26 days.

(21) Appl. No.: 10/461,662

(22) Filed: Jun. 12, 2003

(65) Prior Publication Data

US 2004/0016791 A1 Jan. 29, 2004

(30) Foreign Application Priority Data

Jul. 26, 2002 (TW) ........................................ 91116770 A

(51) Int. Cl.$^7$ ............................................. B23K 31/02
(52) U.S. Cl. ...................................................... 228/178
(58) Field of Search .............................. 228/25, 32, 33, 228/43, 45, 47.1, 49.1, 178

(56) References Cited

U.S. PATENT DOCUMENTS 4,530,456 A * 7/1985 Michelotti .................. 228/102
5,525,777 A * 6/1996 Kukuljan ................ 219/121.83
6,634,092 B1 * 10/2003 Iwasaki ........................ 29/740
6,663,712 B2 * 12/2003 Doyle et al. ................ 118/301

* cited by examiner

Primary Examiner—Lynne R. Edmondson
(74) Attorney, Agent, or Firm—Foley & Lardner LLP

(57) ABSTRACT

An automated soldering system includes a robotic soldering machine and a plurality of feed lines for delivering workpieces to be soldered by the soldering machine. Each of the feed lines transports workpieces such as LCD modules from an input end to a soldering area, and from the soldering area to an outlet end. The soldering areas are arranged within the range of motion of a soldering arm of the soldering machine are preferably arranged in a bilateral triangle having the pivot axis of the soldering are at its apex. The soldering arm is programmed to work reciprocally among the soldering areas, thus increasing the yield of the robotic soldering machine so that the soldering machine is more cost effective. The soldering machine may be programmed to perform different soldering operations at different soldering areas.

22 Claims, 5 Drawing Sheets

AUTOMATED SOLDERING SYSTEM WITH MULTIPLE FEED LINES

BACKGROUND OF THE INVENTION

1. Field of the Invention

Embodiments of the present invention relate to an automated soldering system, and more particularly to an automated soldering system with automated workpiece delivery.

2. Related Technology

In conventional LCD module soldering, most soldering is done manually after stamping of parts by a half-square stamping machine. The soldering operation involves significant manual labor, and it is therefore costly and is a bottleneck in the LCD module fabrication processes. To address this problem, robotic spot soldering machines have been incorporated into the manufacturing process. However, the use of robotic spot soldering machines requires significant ancillary processing including positioning a workpiece on a moveable platform, positioning the platform, positioning the soldering tool, and manual loading and unloading of workpieces. Therefore conventional robotic soldering machines have not eliminated the bottleneck of traditional processing.

More recently, 5-axis servomotor robotic spot soldering machines such as the Unix 531E machine have been developed. These machines increase the speed with which the soldering tool can be positioned relative to the workpiece, and so bottlenecks are reduced. However, these machines are costly and the overall improvement in efficiency that they provide may not offset their cost.

Therefore the current technology fails to provide cost effective high volume LCD module soldering.

SUMMARY OF THE INVENTION

In accordance with embodiments of the invention, an automated soldering system utilizes multiple feed lines for feeding workpieces to a single robotic soldering machine. The use of multiple feed lines allows the yield of the soldering machine to be increased and thus to offset the cost of the machine. In preferred embodiments the multiple feed lines may be arranged such that an outlet end of one feed line is located adjacent to an outlet end of another feed line, or such that an outlet end of one feed line is located adjacent to an input end of another feed line. These arrangements allow multiple lines to be serviced by a single operator, thus reducing the labor costs associated with operation of the system.

Embodiments of the invention may comprise a robotic soldering machine that includes a soldering tool supported on the end of a moveable soldering arm. Multiple feed lines are arranged with respect to the soldering arm such that workpieces transported by the feed lines can be moved into and out of soldering areas within the range of motion of the soldering arm. Each feed line includes an input end where workpieces are introduced to the feed line, a soldering area, and an outlet end where workpieces are removed from the feed line. Workpieces are transported from the input end to the soldering area where they are held stationary until soldered, and are then transported to the outlet end. While one feed line is stationary as a workpiece of that feed line is being soldered, the other feed line or feed lines transport workpieces to their respective soldering areas.

In certain preferred embodiments the feed lines are arranged in a symmetrical manner. In accordance with one preferred embodiment, symmetrical feed lines transport workpieces to respective soldering areas that are arranged approximately as a bilateral triangle, with the pivotal axis of the soldering arm at the apex of the triangle and the soldering areas at its base. In another preferred embodiment, three curved feed lines having approximately equal curvatures are arranged around the pivotal axis of the soldering arm with their respective soldering areas arranged in approximately equidistantly around a pivotal axis of the soldering arm. In this preferred embodiment, the soldering arm reciprocates among soldering at the respective soldering areas of the three feed lines. In another preferred embodiment four or more curved feed lines may be employed.

In accordance with further embodiments of the invention, the soldering areas may comprise positioning devices for positioning the workpiece for soldering by the soldering tool. The positioning device may utilize optical positioning, a mechanical-constraint positioning or another type of positioning. In further embodiments the soldering areas may have more than one positioning device to enable the processing of different types of workpieces.

In accordance with further embodiments of the invention, the soldering area of each feed line may include a lift for elevating the workpiece after it arrives at the soldering area to a position above the level of the feed line. After the work piece is soldered, the lift returns the workpiece to the level of the feed line and the workpiece is transported to the outlet end of the feed line.

In accordance with further embodiments of the invention, each soldering area may further include a clutch mechanism for engaging the workpiece to move it into and out of the soldering area.

In accordance with further embodiments of the invention, a return line may be provided for transporting soldered workpieces from the outlet end of a feed line to the vicinity of the input end of that feed line.

In accordance with further embodiments of the invention, the multiple feed lines may transport the same types of workpieces or different types of workpieces to the soldering robot concurrently.

BRIEF DESCRIPTION OF THE DRAWINGS

The foregoing aspects and further features and advantages of embodiments of the invention are discussed in the following detailed description in conjunction with the accompanying drawings, wherein.

DETAILED DESCRIPTION OF THE PREFERRED EMBODIMENT

Preferred embodiments for automated soldering of LCD modules are now described. In accordance with embodiments of the invention, an LCD module is typically fixed to a palate and then soldered. LCD modules of varying sizes (e.g. 12–15 inches) are typically fixed to the palates of the same size. In the following description, the term LCD module generally denotes an LCD module that has been fixed to a palate for transportation and soldering. It will be appreciated however that alternative embodiments of the invention may be implemented for soldering other types of workpieces.

Embodiments of a soldering system in accordance with the invention typically include a robotic soldering machine including a movable soldering arm that supports a soldering tool, and a plurality of feed lines arranged around a pivotal axis of the soldering arm so that respective soldering areas of the feed lines are within the range of motion of the soldering arm. Each feed line transports a work piece from an input end to a soldering area where it is soldered, and from the soldering area to an outlet end where it is unloaded from the feed line. The movement of the feed line is suspended when a workpiece is in the soldering location until soldering of the workpiece is completed. As a general matter, the feed lines are arranged with their soldering areas close to the soldering arm, and their input and outlet ends more distant from the soldering arm, so that more space is provided for operators to load and unload the feed lines and more feed lines may be used to transport workpieces to soldering areas arranged within the range of motion of the soldering arm.

First Embodiment

Figure 1:
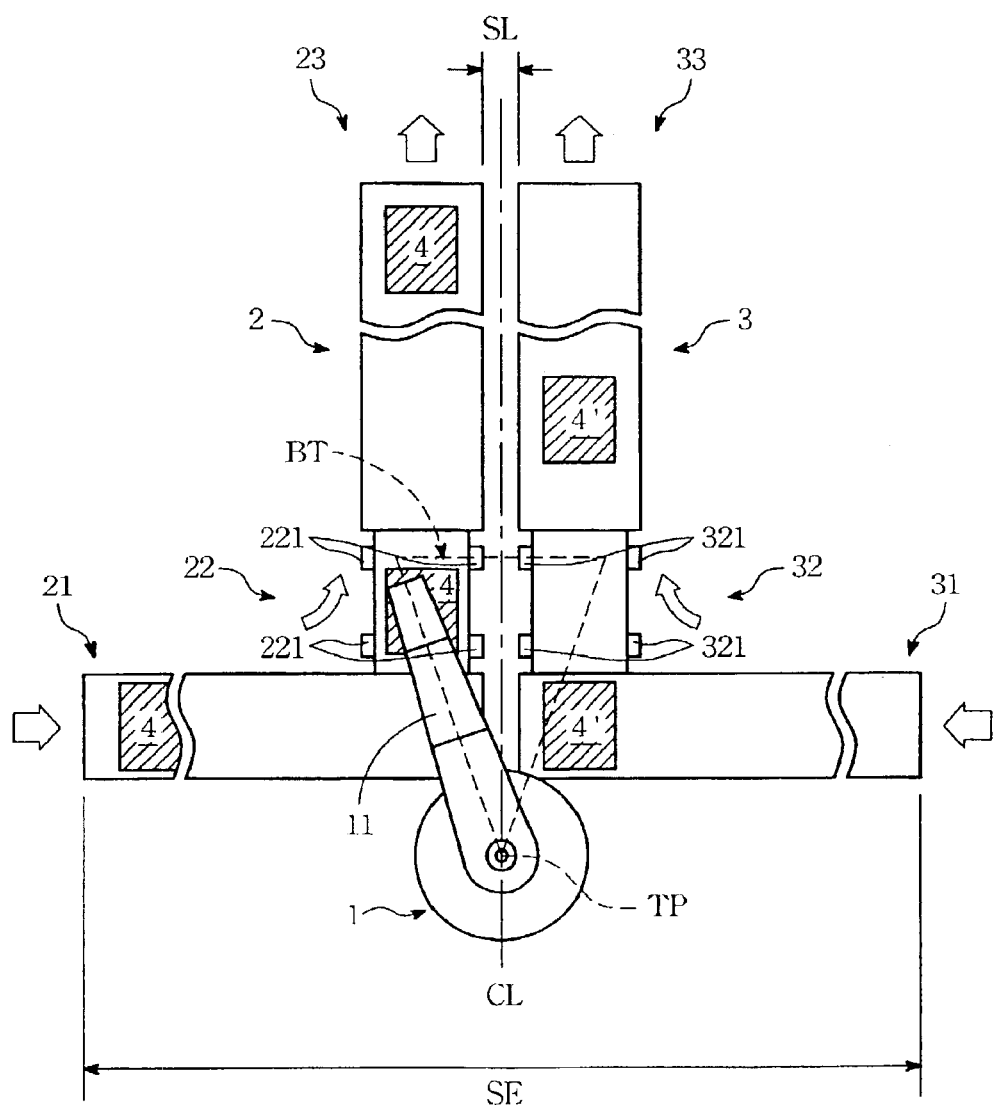
FIG. 1 is a schematic plan view of a first preferred embodiment of a soldering system using two feed lines.

FIG. 1 shows a schematic plan view of an automated soldering system using two feed lines in accordance with a first preferred embodiment of the invention. As shown in FIG. 1, the soldering system comprises a robotic soldering machine 1, a first feed line 2 and a second feed line 3. The soldering machine 1 includes a moveable soldering arm 11 that supports a soldering tool for soldering workpieces such as LCD modules. The soldering machine is preferably a spot soldering machine such as a Unix 531 E or another soldering machine with a soldering arm having programmable motion and a range of motion defined in part by rotation about a pivotal axis. Such soldering machines are preferred for their freedom of motion, their ability to perform complex processing and their programmability.

The first feed line 2 is used to transport a first type of work piece 4 for soldering by the soldering machine 1. The first feed line 2 includes an input end 21 where workpieces are fed, a soldering area 22 where workpieces are soldered, and an outlet end 23. The feed line has a feeding state in which workpieces are transported, and a stationary state in which workpieces are held stationary while a workpiece in the soldering area is being soldered.

The second feed line 3 is similarly used to transport a second type of work piece 4' for soldering by the soldering machine 1. The second feed line 3 includes an input end 31 where workpieces are fed, a soldering area 32 where workpieces are soldered, and an outlet end 33. The second feed line also has a feeding state in which workpieces are transported, and a stationary state in which workpieces are held stationary while a workpiece in the soldering area is being soldered. Typically the second feed line 3 transports workpieces while the first feed line 2 is stationary.

As shown in FIG. 1, the soldering machine 1 and the soldering areas 22, 32 are preferably arranged in approximately the form of a bilateral triangle BT, with the soldering robot 1 located at the apex TP of the triangle BT and the soldering areas 22, 32 provided at the base of the triangle in the path of radial movement of the soldering arm 11.

As seen in FIG. 1, the first preferred embodiment employs feed lines 2, 3 that are symmetrical with respect to a central line CL. The input ends 21, 31 of the feed lines 4, 4' are spaced a predetermined feeding distance SE apart, and the outlet ends 23, 33 are spaced a predetermined outlet distance SL apart. The predetermined feeding distance SE is preferably at least twice as large as the predetermined outlet distance SL, which facilitates deployment of operators for loading and unloading work pieces. The loading operator preferably loads workpieces 4, 4' and makes an initial orientation of the workpieces 4, 4' on the feed line, while the unloading operator simply unloads the feed lines. Since the task of unloading is less time consuming, two loading operators and only one unloading operator may be employed, thus reducing the manual labor required to support the soldering system.

The work pieces 4, 4' are preferably stationary when being soldered by the soldering machine 1, allowing the soldering arm 11 to work in a reciprocal manner between the first soldering area 22 and the second soldering area 32. Thus, when the soldering arm 11 is soldering at the first soldering area 22, the second feed line 3 transports a work piece 4' to the second soldering area 32, and when the robotic soldering arm 11 is soldering at the second soldering area 32, the first feed line 2 transports a work piece 4 to the first soldering area 22. The workpieces 4, 4' delivered to the respective soldering areas 22, 32 may be the same type of work piece or a different type of work piece. For example, the first feed line may supply 15" LCD modules while the second feed line may supply 14" LCD modules. Th soldering machine 1 may be programmed to provide different types of soldering at each soldering area to facilitate concurrent processing of different types of workpieces.

The feed lines preferably include respective positioning devices 221, 321 for positioning workpieces in their respective soldering areas 22, 32. The positioning devices 221, 321 can be optical positioning devices, mechanical-constraint positioning devices or other positioning structures or mechanism having similar functions. Taiwan Patent 135,170 describes a mechanical-constraint type positioning device that may be employed in embodiments of the invention.

A variety of manners for implementing the feed lines are known and thus are not described in detail. As a general matter, the feed lines may comprise belts, roller mechanism, chains or other transportation mechanisms having similar functions. In the embodiment of FIG. 1, the first feed line 2 and the second feed line 3 have respective right angle portions that require mechanisms for changing the transportation direction of the feed lines.

Second Embodiment

Figure 2:
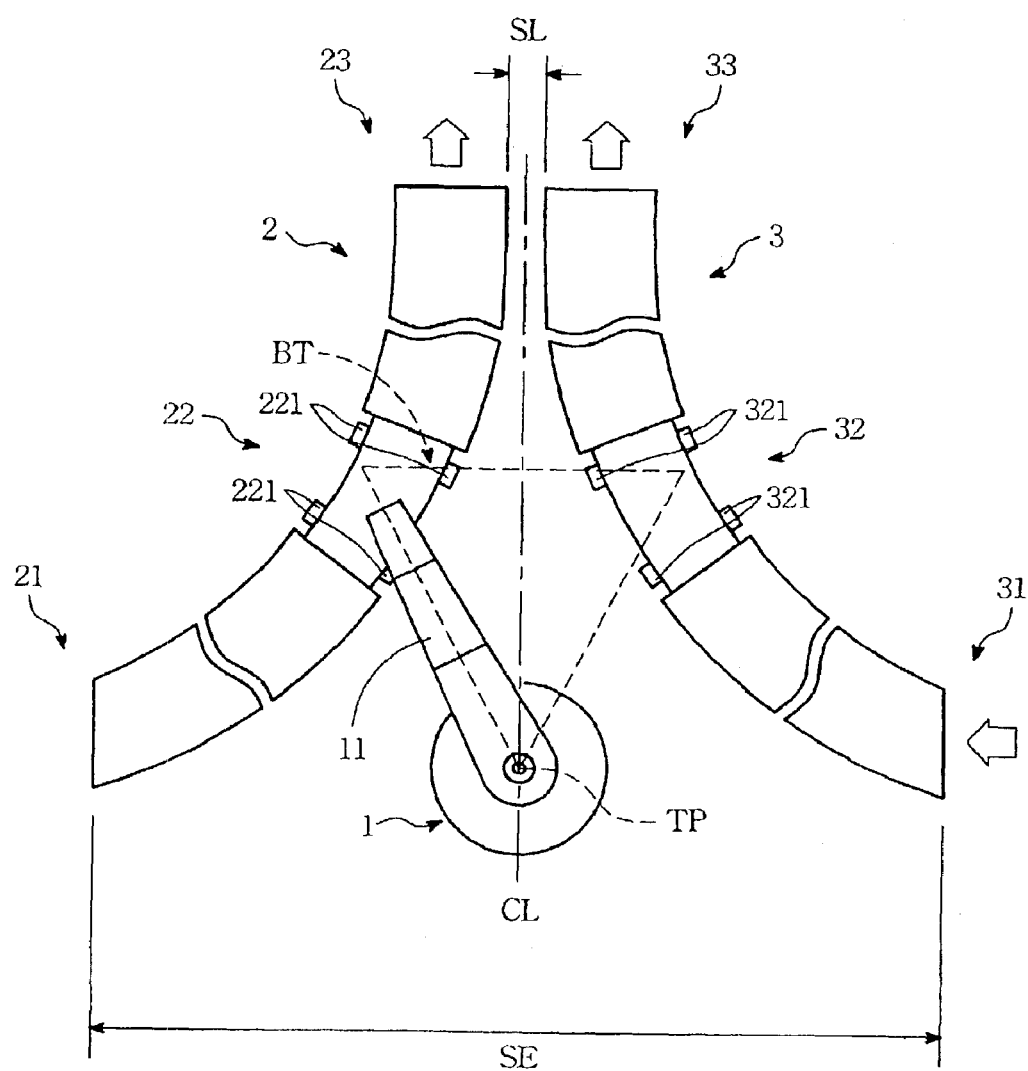
FIG. 2 is a schematic plan view of a second preferred embodiment of a soldering system using two feed lines.

FIG. 2 shows a schematic plan view of an automated soldering system using two feed lines 2, 3 in accordance with a second preferred embodiment of the invention. The second preferred embodiment improves over the first preferred embodiment by using curved feed lines. Although this design increases the required range of motion of the soldering arm 11, the design eliminates the right angle portion of the feed lines and thus simplifies the transportation structure of the feed lines. Like the feed lines of the first preferred embodiment, the feed lines of the second preferred embodiment are arranged to be supported by two operators loading workpieces to respective feed lines and one operator unloading workpieces from both feed lines.

Third Embodiment

Figure 3:
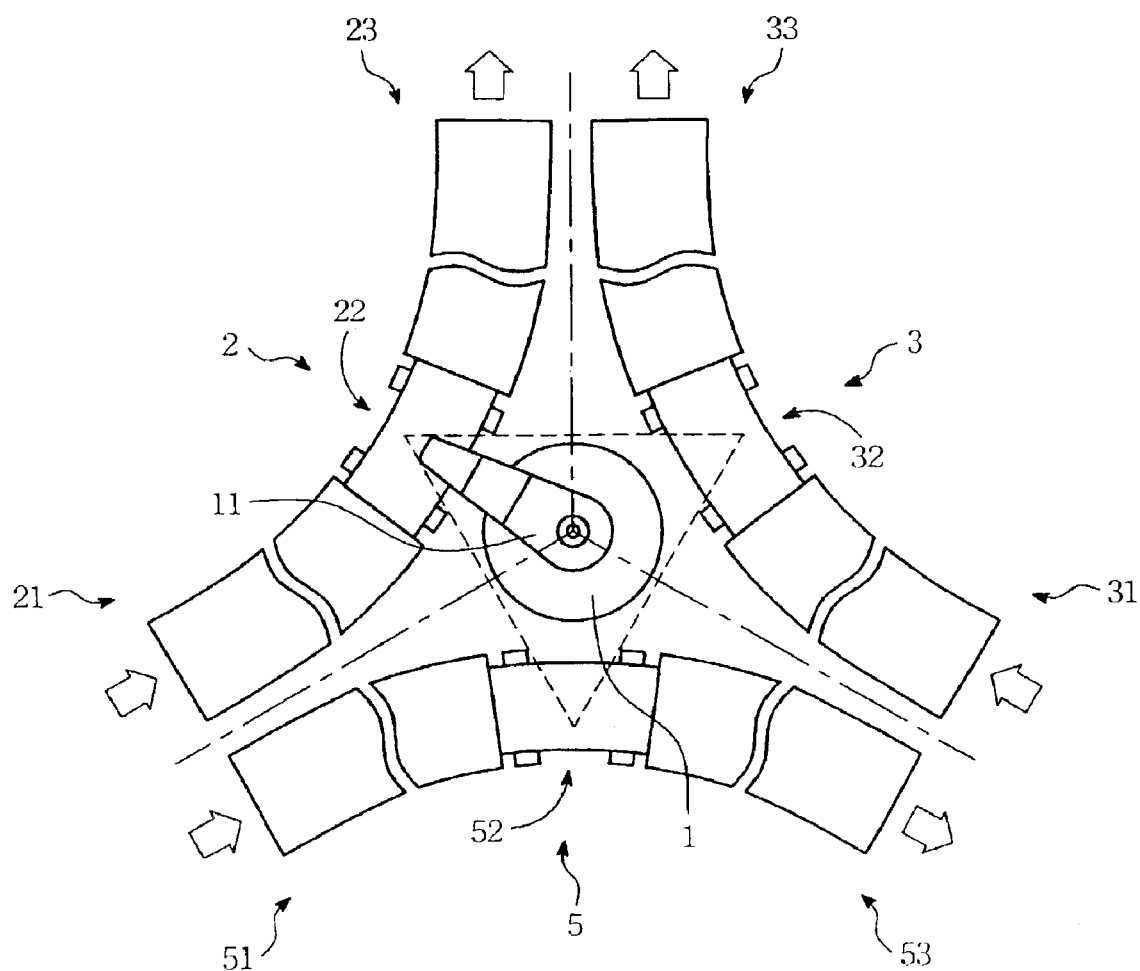
FIG. 3 is a schematic plan view of a third preferred embodiment of a soldering system using three feed lines.

FIG. 3 shows a schematic plan view of an automated soldering system using three curved feed lines 2, 3, 5 in accordance with a third preferred embodiment of the invention. The three feed lines have approximately equal curvatures, and the soldering areas 2, 3, 5 are arranged approximately equidistantly around a pivotal axis of the soldering arm 11. Although the third embodiment requires a greater range of motion of the soldering arm 11, the third preferred embodiment improves over the second preferred embodiment, in that overall system efficiency is increased through the use of a third feed line while still requiring only three operators. In the preferred embodiment of FIG. 3, the feed lines are arranged such that one operator loads two feed lines, one operator unloads two feed lines, and one operator loads one feed line and unloads another feed line. However the direction of the first feed line 2 may alternatively be reversed so that each operator loads one feed line and unloads one feed line. Each of the feed lines may supply a different type of workpiece to the soldering machine.

Fourth Embodiment

Figure 7:
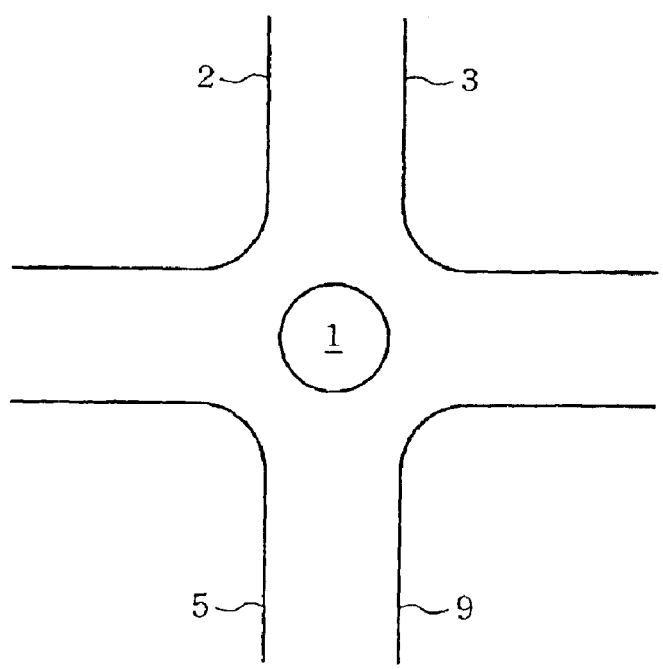
FIG. 7 is a schematic plan view of a fourth preferred embodiment of a soldering system using four feed lines.

FIG. 7 shows a schematic plan view of an automated soldering system using four feed lines 2, 3, 5, 9 in accordance with a fourth preferred embodiment of the invention. The embodiment of FIG. 7 is supported by four operators and the directions of the feed lines may be selected to provide various combinations of input and output tasks for each operator. Each of the feed lines may supply a different type of workpiece to the soldering machine.

The layouts of the feed lines in each of the four preferred embodiments may be adjusted to provide optimized processing in accordance with various factors such as the time required for soldering of each type of workpiece processed by the system, the speed of each feed line and other related factors. Each embodiment may provide concurrent processing of different types of workpieces through appropriate programming of the robotic soldering arm 11.

Figure 4:
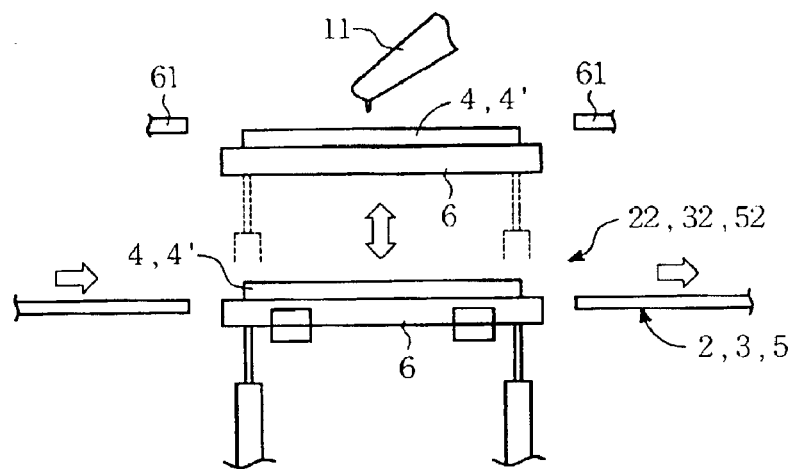
FIG. 4 is a schematic sectional view of a lift used at a soldering area in accordance an embodiment of the invention.

In the aforementioned embodiments of the invention it is preferred to use a lift mechanism in each of the soldering areas 22, 32, 52 to elevate the workpiece above the level of the feed lines and thereby to prevent interference between the soldering tool of the soldering arm 11 and the feed lines. FIG. 4 shows one embodiment of a lift mechanism for use in each of the soldering areas 22, 32, 52. The lift 6 comprises a platform that is elevated by a hydraulic, pneumatic or other type of driver. The lift 6 is located in the soldering area. Workpieces are conveyed to the lift 6 from the input end of the feed line. Once a workpiece is positioned on the lift 6, the lift elevates the workpiece to a level that is above the level of the feed line. The workpiece is soldered by the soldering tool while it is lift is elevated, and the lift then returns the workpiece to the level of the feed line to be delivered to the outlet end of the feed line.

As further shown in FIG. 4, preferred embodiments of the invention also include at least one auxiliary positioning device 61 provided at a position relative to the extended position of the lift 6. The auxiliary positioning device 61 positions the workpiece for processing after the lift 6 is raised. The number of auxiliary positioning devices provided may be determined in accordance with the types and sizes of workpieces to be processed at that soldering area. The auxiliary positioning devices may be optical positioning devices, mechanical-constraint positioning devices or other positioning structures or mechanisms having similar functions.

Figure 5:
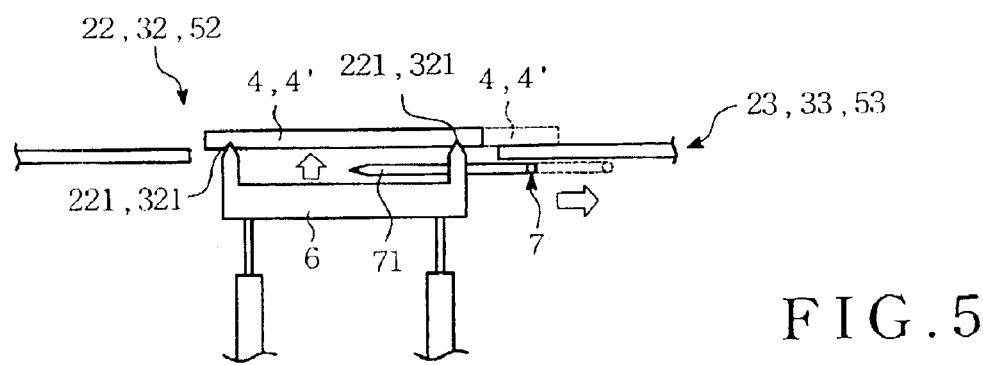
FIG. 5 is a schematic sectional view of a clutch mechanism used at a soldering area in accordance with an embodiment of the invention.

As shown in FIG. 5, preferred embodiments of the invention further include clutch mechanisms 7 at the soldering areas for moving workpieces into and out of the soldering areas. FIG. 5 provides a schematic sectional view of a clutch mechanism 7. The clutch mechanism 7 is mounted adjacent to a soldering area 22, 32 or 52, and includes a clutch stand 71 for moving the work piece 4 or 4'. As shown in FIG. 5, when the lift 6 descends to the level of the feed line and the feed line returns to a feeding state, the clutch stand 71 of the clutch mechanism 7 moves the work piece 4 or 4' from the soldering area 22, 32, or 52 onto the feed line 2, 3, or 5 to be transported to the outlet end of the feed line. A variety of types of clutch mechanism may be implemented in accordance with the invention, including vacuum mechanisms, parallel four-bar linkage mechanisms and other mechanism having similar functions.

As further shown in FIG. 5, in this embodiment, the positioning device 221, 321 provided at the soldering area 22, 32, or 52 is implemented as a plurality of projections that engage corresponding apertures in the workpiece.

Figure 6:
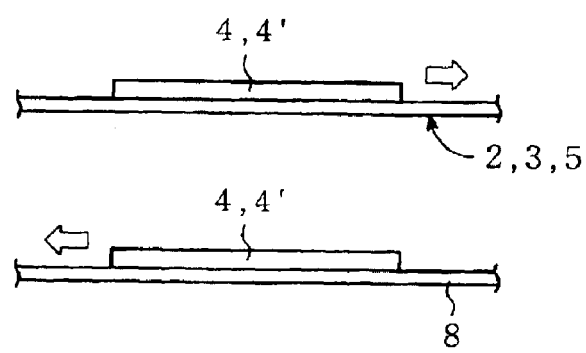
FIG. 6 is a schematic sectional view of a return line provided beneath the input end of a feed line in accordance with an embodiment of the invention.

As shown in FIG. 6, preferred embodiments of the invention further comprise a return line 8 that transports workpieces from the outlet end of the feed line back to the vicinity of the input end of that feed line. The output end of the return line is preferably provided beneath the input end of the corresponding feed line as shown in FIG. 6. This enables workpieces to be transported to the location of an operator from which they originated without requiring additional lateral space for providing the return line.

A variety of alternatives in accordance with the invention may therefore be implemented. As a general matter, embodiments of the invention are characterized by a robotic soldering machine to which workpieces are transported for soldering by multiple feed lines. The feed lines generally transport workpieces to soldering areas where the workpieces are held stationary until soldered. The feed lines preferably are symmetrical or provided with approximately equal curvature so that soldering areas of the feed lines can be arranged in a regular pattern around the soldering machine, allowing the soldering machine to alternate between soldering of workpieces at each of the soldering areas. The soldering machine may be programmed to perform different soldering operations at each soldering area so that different types of workpieces may be processed concurrently.

It will be apparent to those having ordinary skill in the art that the features and processing described above are not necessarily exclusive of other features or processing, but rather that further features and processing may be incorporated in accordance with a particular implementation. Thus, while the embodiments illustrated in the figures and described above are presently preferred, it should be understood that these embodiments are offered by way of example only. The invention is not limited to a particular embodiment, but extends to various modifications, combinations, and permutations that fall within the scope of the claimed inventions and their equivalents.

What is claimed is:

1. An automated soldering system, comprising:
   a robotic soldering machine including a moveable soldering arm supporting a soldering tool; and
   a plurality of feed lines, each for transporting workpieces from an input end to a respective soldering area within a range of motion of the soldering arm, and from said soldering area to an outlet end,
   wherein the robotic soldering machine is programmed to reciprocate among soldering of workpieces at each of the respective soldering areas,
   wherein each of the feed lines suspends its transportation of workpieces when a workpiece is delivered to its respective soldering area until that workpiece has been soldered by the soldering machine; and wherein the robotic soldering machine and the soldering areas are arranged to form an approximately bilateral triangle having a pivotal axis of the soldering arm at the apex of the triangle and any two adjacent soldering areas at the base of the triangle.

2. The system claimed in claim 1, further comprising a positioning device provided at each of the soldering areas to position workpieces for soldering.

3. The system claimed in claim 2, wherein the positioning device is an optical positioning device.

4. The system claimed in claim 2, wherein the positioning device is a mechanical-constraint positioning device.

5. The system claimed in claim 1, further comprising a lift provided at each of the soldering areas for elevating a workpiece in the soldering area to a level above the corresponding feed line prior to soldering of the workpiece and for returning the workpiece to the level of the feed line after soldering.

6. The system claimed in claim 5, further comprising an auxiliary positioning device for positioning a workpiece when the workpiece is elevated by said lift.

7. The system claimed in claim 6, wherein the auxiliary positioning device is an optical positioning device.

8. The system claimed in claim 6, wherein the auxiliary positioning device is a mechanical-constraint positioning device.

9. The system claimed in claim 1, further comprising a clutch mechanism provided at each of the soldering areas for moving a work piece from a soldering area to a feed line after soldering of the workpiece.

10. The system claimed in claim 1, further comprising a return line for transporting soldered workpieces from the outlet end of a feed line to the vicinity of the input end of the feed line.

11. The system claimed in claim 10, wherein an outlet end of the return line is located beneath the input end of the corresponding feed line.

12. The system claimed in claim 1, wherein the plurality of feed lines comprise two feed lines arranged symmetrically with respect to the robotic soldering machine.

13. The system claimed in claim 1, wherein the plurality of feed lines comprise at least two curved feed lines having approximately equal curvatures and arranged symmetrically with respect to the robotic soldering machine.

14. The system claimed in claim 1, wherein the plurality of feed lines comprise at least three curved feed lines having approximately equal curvatures, and wherein the respective soldering areas of the feed lines are arranged approximately equidistantly around a pivotal axis of the soldering arm.

15. The system claimed in claim 1, wherein the plurality of feed lines comprise two feed lines arranged to receive workpieces from respective operator positions at their input ends and further arranged to deliver workpieces to a single operator position at their outlet ends.

16. The system claimed in claim 1, wherein the plurality of feed lines comprise three feed lines, two of the feed lines being arranged to deliver workpieces to a single operator position at their outlet ends.

17. The system claimed in claim 1, wherein the plurality of feed lines comprise at least three feed lines arranged such that an outlet end of each feed line is located adjacent an input end of another feed line.

18. The system claimed in claim 1, wherein the robotic soldering machine is further programmed to perform different soldering operations at one or more of said soldering areas.

19. A method for automated soldering of workpieces, comprising:

transporting unsoldered workpieces from input ends of respective multiple feed lines to respective soldering areas of the multiple feed lines arranged within a range of motion of a soldering tool supported on a soldering arm;

alternately soldering workpieces at each of the respective soldering areas by the moveable soldering arm, wherein a workpiece is stationary during soldering; and transporting soldered workpieces from said respective soldering areas to outlet ends of said respective feed lines;

wherein the soldering arm and the soldering areas are arranged to form an approximately bilateral triangle having a pivotal axis of the soldering arm at the apex of the triangle and any two adjacent soldering areas at the base of the triangle.

20. The method claimed in claim 19, further comprising:

elevating each workpiece to a level above its feed lines before soldering the workpiece; and returning each workpiece to the level of its feed lines after soldering the workpiece.

21. The method claimed in claim 19, further comprising returning workpieces from outlet ends of feed lines to the vicinities of corresponding input ends of the feed lines via respective return lines.

22. The method claimed in claim 19, wherein soldering said workpieces comprises performing different soldering operations at one or more of said soldering areas.

* * * * *